Figure 2:
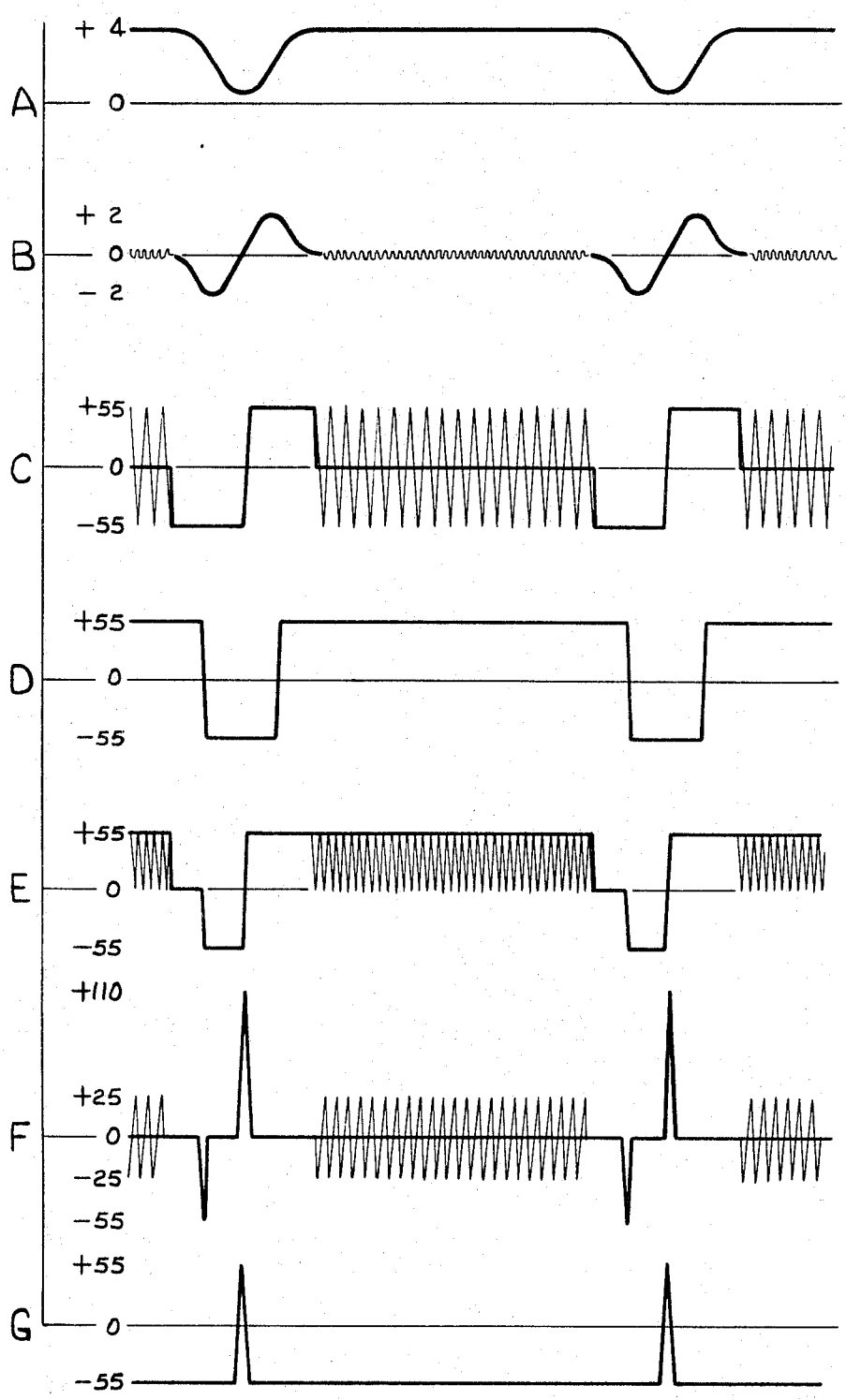

June 27, 1967     F. W. WANTLAND     3,328,704
PULSE PEAK DETECTOR
Filed March 10, 1964     2 Sheets-Sheet 1
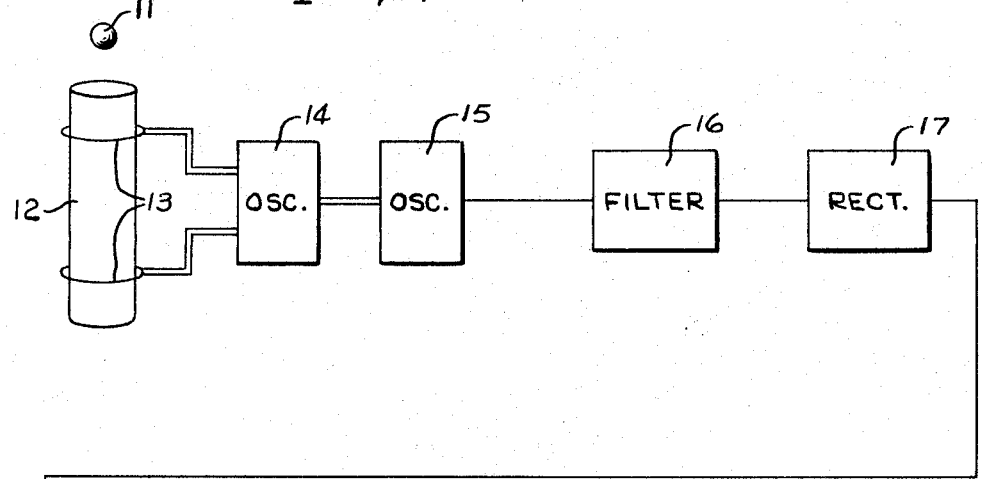
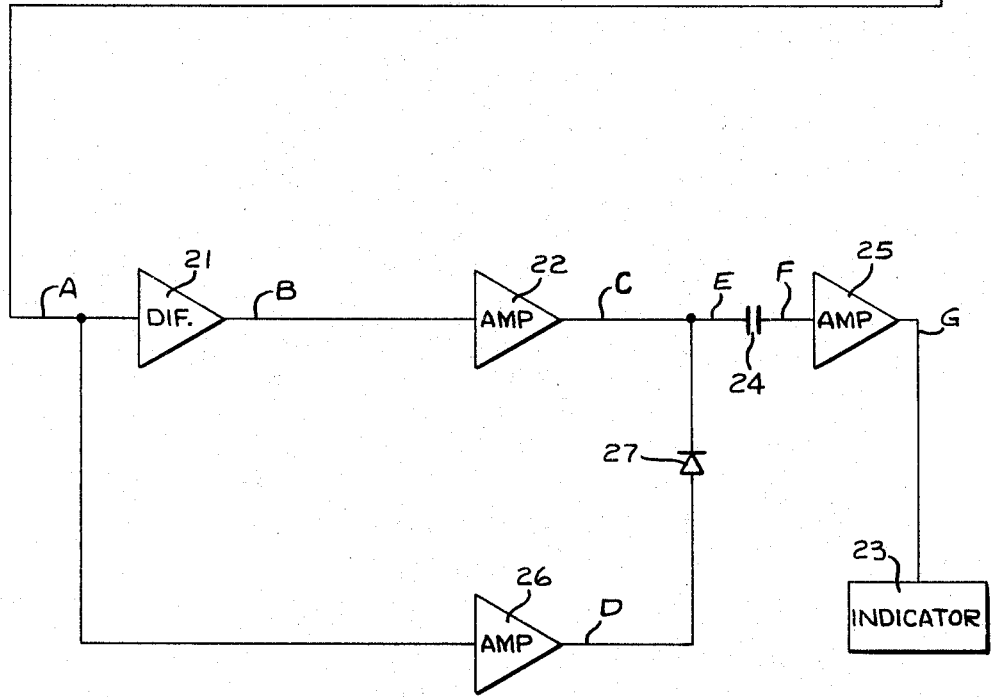
INVENTOR
F. W. WANTLAND
BY
ATTORNEY

United States Patent Office 3,328,704
Patented June 27, 1967

3,328,704
PULSE PEAK DETECTOR
Frederick W. Wantland, Indianapolis, Ind., assignor to Western Electric Company, Incorporated, New York, N.Y., a corporation of New York
Filed Mar. 10, 1964, Ser. No. 350,909
1 Claim. (Cl. 328—150)

This invention relates to apparatus for accurately indicating the instant at which an input pulse of substantial time duration reaches its peak value. It is an object of the invention to provide improved apparatus of that character.

There are many applications in which it is desirable to indicate with considerable accuracy the instant at which a broad-based pulse reaches its peak value. Where the indicating device is made directly responsive to the peak value of the input pulse, accuracy is severely limited by variables such as variation in the peak value of the input pulse and variation in the response characteristics of the indicator. As a result of these variables, if an indication is to be assured it must occur at some point along the rising slope of the input pulse, rather than at its peak.

In many situations it is desired that the instant at which the input pulse reaches its peak value be indicated with much greater accuracy than it is practical to attain by a direct reading system. The present invention permits the determination of the instant that the input pulse reaches its peak value to a high degree of accuracy without the necessity of precise control of the peak value of the pulse or of the response characteristics of the indicator.

Accordingly, it is another object of the invention to provide apparatus for accurately indicating the instant at which an input pulse of substantial time duration reaches its peak value without the necessity of controlling the peak value of the input pulse and without the necessity of an indicator having precise response characteristics.

It is a further object of the invention to provide improved apparatus of this character in which any false signals or noise induced within the apparatus are prevented from producing a false indication.

In accordance with the preferred embodiment of the invention, the input pulse is fed to a differentiator which produces, in response to an input pulse, an output signal consisting of contiguous positive and negative output pulses, the output signal passing through a reference value substantially at the instant at which the input pulse reaches its peak value. This signal is fed to a high gain amplifier which produces an output signal which changes rapidly and substantially in value as the value of the output signal of the differentiator passes through the immediate region of its reference value. The output of the amplifier is fed to an indicator which indicates the time at which the output of the amplifier is thus changed.

Preferably, the effect of any false signals and noise is prevented from actuating the indicator through the incorporation of a second high gain amplifier and a rectifier. The original input pulse is fed to the second high gain amplifier, and the output of the second amplifier is connected through the rectifier to the output of the first amplifier. The second amplifier is adjusted so that the polarity of its output signal swings sharply from one polarity to the other during the rise in value of the input pulse, and the output signal returns to its original polarity during the decay of value of the input pulse. The polarities of the outputs of the two amplifiers, and the orientation of the rectifier are such that the second amplifier loads the output of the first amplifier at all times except for the interval during which the polarity of the second amplifier is reversed and during which the input pulse reaches its peak value. During this interval both amplifiers are substantially saturated such that false signals or noise have substantially no effect. At all times other than during this interval, the effect of false signals and noise is substantially halved.

This invention, together with further objects and advantages thereof, will best be understood by reference to the following description taken in connection with the accompanying drawings, in which FIG. 1 is a block diagram of a circuit embodying the present invention, and FIG. 2 is a graphical representation of signals appearing at various designated points in the circuit illustrated in FIG. 1.

While there are many applications of the present invention which will be obvious to those skilled in the art, a specific application is illustrated in FIG. 1 in which the viscosity of liquids is tested. As is common in viscosity testing, a steel ball 11 is allowed to fall through a sample of the liquid contained in a tube 12. In the interest of greater accuracy than can be obtained by direct observation, particularly where the viscosity is low, the passage of the dropping ball past designated points is detected by means of coils 13. The passage of the steel ball 11 through coils 13 successively alters the inductance of the coils such that the output frequency of a first oscillator 14 is altered, the change in frequency reaching a peak when the ball is centered within either of the coils. The output of the first oscillator is beat against a second oscillator 15 to produce a varying beat frequency in the audio range.

This audio frequency is fed to a filter 16 which is tuned to a frequency just beyond the peak frequency fed thereto. Accordingly, the output from the filter is an A.C. signal which reaches a peak magnitude when the steel ball is centered within either one of the coils. This signal is fed to a rectifier 17 which produces a D.C. pulse.

The circuitry described above is conventional, and is commonly employed to produce a D.C. pulse which is indicative of the passage of the ball through either of the coils 13 in the testing of viscosity.

The D.C. pulse which is produced by this apparatus is necessarily broad-based, i.e., it has a substantial time duration between its initial rise and subsequent terminal fall portions, since the duration of the pulse is substantially equal to the time required for the entire ball 11 to pass through a coil 13. The shape of the pulse tends to be as shown in line A of FIG. 2, and this signal is hereinafter designated by the letter A.

In order to obtain an accurate indication of the time at which the ball 11 passes a coil 13, it is necessary to obtain an accurate indication of the instant at which this input pulse A reaches its peak value, this corresponding to the instant at which the ball 11 is centered within one of the coils 13. The apparatus shown in the lower portion of FIG. 1 serves to provide an accurate indication of the instant at which each of the two successive D.C. pulses reaches its respective peak value.

The input pulse is fed to a differentiator 21 which may be of conventional design. More particularly, it may be composed of a UPA–2 operational amplifier manufactured by Philbrick Researches, Inc., modified as recommended by the manufacturer. This differentiator produces contiguous positive and negative pulses in response to an input pulse fed thereto, the output signal of the differentiator passing through a reference value at the instant that the input pulse reaches its peak value, that is, when the slope of the input pulse is zero. The output of the differentiator 21 is illustrated on line B of FIG. 2.

This output signal B from the differentiator 21 is fed to a high gain amplifier 22 which may be of conventional design. More particularly, it may be the K2–W operational amplifier produced by Philbrick Researches, Inc.

This amplifier is biased, by conventional biasing means, such that its output (illustrated on line C of FIG. 2) is zero when the input signal B is at its zero or reference value.

As the signal B deviates by a small amount from its reference value, the output signal C of the amplifier 22 rises steeply to its maximum value. For practical reasons, the output signal of the amplifier 22 is limited as to the attainable value as shown on line C of FIG. 2.

As the input pulse A passes through its peak value, the differentiator output B passes through its reference value. During the brief period that the differentiator output signal B passes through the immediate region of the reference value, the output signal C of the amplifier 22 changes rapidly from its maximum negative value to its maximum positive value. When the output signal B of the differentiator 21 returns to its zero or reference value, the output signal C of the amplifier 22 returns to zero value. Basically, the output signal C remains at zero value until the beginning of the next input pulse. The noise output at C indicated by the fine tracings in line C of FIG. 2, and its effects, are described below.

Through the means thus far described, a substantial signal is produced substantially at the instant that the input pulse A reaches its peak value, this signal being the rapid and substantial change in voltage, from maximum negative voltage to maximum positive voltage, of the output C of the amplifier 22. This signal may be employed in a variety of ways, obvious to those skilled in the art, to actuate a suitable indicator 23 such as a digital, electronic time-interval meter (e.g. Beckman Co., Inc. Model No. 7370) whose indication is indicative of the instant at which the input pulse A reaches its peak value. One device for converting the rapid and substantial voltage change of the output signal C of the amplifier 22 to a readily detectable form is a capacitor 24 arranged in the line connecting the amplifier 22 with the indicator 23. If the capacitance value of the capacitor 24 is small in terms of the input impedance of the indicator 23, the rapid voltage change in the output signal C of the amplifier 22 produces a momentary peak voltage at the input to the indicator 23, such as is represented by the two large positive peaks on line F of FIG. 2. Such a peaked input readily produces quick and accurate response of the indicator 23 to the attainment of peak voltage on the part of the input pulse A.

Depending upon various parameters of this system, including the sensitivity of the indicator 23, it may be desirable to have a third D.C. amplifier 25 arranged in the circuit as shown.

In the event that there are any false signals or noise within the system, the output signal B of the differentiator 21 may be affected as shown on line B of FIG. 2. Because of the high gain of the amplifier 22, the ripples in the output signal B may cause the output signal C of the amplifier 22 to oscillate between its maximum values. More specifically, because of the high gain of the amplifier 22 and because of the fact that its output is limited, for practical reasons, low level noise in the output B of the differentiator 21 may cause as large an oscillation in the signal C as do the true pulses of the signal B.

In accordance with one embodiment of the invention, additional circuitry is provided in order to prevent operation of the indicator by noise signals. An additional high gain amplifier 26 is provided, the input pulse A being fed to this amplifier 26 as well as to the differentiator 21. The amplifier 26 is biased such that its output is normally of maximum value of one polarity (+55 volts) and is caused to reverse its polarity during the first half of the input pulse shown in line A of FIG. 2. The output signal D of the amplifier 26, as illustrated on line D of FIG. 2, returns to its original polarity during the second half of the input pulse. The output D of the amplifier 26 is normally +55 volts, with no input pulse, but swings to −55 volts for a short interval. During this interval the input pulse A reaches its peak value. The output of the amplifier 26 is connected through a rectifier 27 to the output of the amplifier 22, as shown.

With the polarities of the various signals as indicated in FIG. 2 and with the rectifier 27 oriented as illustrated in FIG. 1, the amplifier 26 loads the output of the amplifier 22 at all times except for the intervals referred to immediately above, during which the input pulses pass through their peak values. More specifically, when the output signal D of the amplifier 26 is at its normal level (+55 volts) and the output C of the amplifier 22 is negative, current flows through the rectifier 27 such that the combined or net output supplied to the capacitor 24 is at zero value.

This is illustrated in line E of FIG. 2 wherein it may be seen that the oscillations induced by noise are reduced to half scale as compared to those shown on line C of FIG. 2. More specifically, the oscillations induced by noise are confined to oscillations between the reference line and the maximum positive value.

It may also be noted that when the basic output C of the amplifier 22 tends to drop to −55 volts at the beginning of an input pulse, the output D of the amplifier 26 is still +55 volts with the result that the net or combined output E is at zero value. This does not affect the operation of the circuit since the net output E does attain the maximum negative value when the output D of the amplifier 26 swings to its negative value, prior to the time that the input pulse A reaches its peak value.

It should also be noted that upon the reversal of the basic output signal C of the amplifier 22 from maximum negative value to maximum positive value, while the output D of the amplifier 26 remains at maximum negative value, the output circuit of the amplifier 26 does not load the output of the amplifier 22 since the polarities are such that the amplifiers are isolated by the rectifier 27. Presence of the rectifier 27 results in loading of the output C of the amplifier 22 only when the output D of the amplifier 26 is positive.

Through the addition of the simple circuitry consisting of the amplifier 26 and the rectifier 27, the effect of false signals and noise is substantially halved, such that the true signal is readily distinguished.

The net output signal on the output side of the capacitor 24 is illustrated in line F of FIG. 2. With the noise signal reduced as shown and as described above the amplifier 25 may readily be biased such that it clearly distinguishes between the true signal and the noise signals. As a result, the output G of the amplifier 25 consists of a single pulse for each input pulse A, as illustrated in line G of FIG. 2.

As will be apparent to those skilled in the art, the output signals C and D do not appear at any point in the complete circuit shown in FIG. 1, these being only signals which the respective amplifiers 22 and 26 would produce if not affected by the other. Only the net or combined output E actually appears in the circuit.

It will be now seen that the apparatus illustrated in the drawings and described above produces an accurate indication of the instant at which an input pulse of substantial time duration reaches its peak value. This is accomplished without the necessity of accurate control of the value of the input pulse and without accurate control of the response characteristics of the indicator proper. In accordance with one embodiment of the invention, this is accomplished accurately and reliably in spite of false signal and noise problems which are common where high gain amplifiers are employed.

While various embodiments of the invention have been disclosed, many modifications will be apparent, and it is intended that the invention be interpreted as including all modifications which fall within the true spirit and scope of the invention.

What is claimed is:

Apparatus for accurately indicating the instant at which an input pulse of substantial time duration between its initial rise and subsequent terminal fall portions reaches its peak value, which comprises
- a differentiator arranged to have the input pulse fed thereto, and for producing an output signal which consists of contiguous positive and negative output pulses and which passes through a reference value substantially at the instant at which the input pulse reaches its peak;
- a first high gain amplifier connected to the output of said differentiator for producing an output signal which changes rapidly and substantially in value as the value of the output signal of said differentiator passes through the reference value;
- means connected to the output of said first amplifier for indicating the time at which the output of said amplifier is thus changed; and
- a second high gain amplifier arranged to have the input pulse fed thereto, and for producing an output signal of a first polarity for intervals during which the input pulses pass through their peak values and of the other polarity during the initial and terminal portions of the input pulses and between input pulses;
- the output of said second amplifier being connected through a rectifier to the output of said first amplifier, the relative polarities of the output signals of said amplifiers and the orientation of the rectifier being such that the second amplifier loads the output of said first amplifier at all times except for said intervals during which the input pulses pass through their peak values, whereby the output signal of said first amplifier caused by any false signals and noise during the initial and terminal portions of an input pulse and between input pulses is substantially halved.

References Cited

UNITED STATES PATENTS 3,048,717 8/1962 Jenkins _____ 307—88.5
3,235,807 2/1966 Appel _____ 328—118 X
3,254,230 5/1966 Wahrer _____ 328—150 X ARTHUR GAUSS, *Primary Examiner.*

J. ZAZWORSKY, *Assistant Examiner.*